(12) United States Patent
Lee et al.

(10) Patent No.: US 10,763,492 B2
(45) Date of Patent: Sep. 1, 2020

(54) INTEGRATED ELECTRODE ASSEMBLY AND ELECTROCHEMICAL DEVICE COMPRISING SAME

(71) Applicant: LG Chem, Ltd., Seoul (KR)

(72) Inventors: Joo-Sung Lee, Daejeon (KR); Sun-Mi Jin, Daejeon (KR)

(73) Assignee: LG Chem, Ltd. (KR)

( * ) Notice: Subject to any disclaimer, the term of this patent is extended or adjusted under 35 U.S.C. 154(b) by 287 days.

(21) Appl. No.: 15/542,341

(22) PCT Filed: Feb. 19, 2016

(86) PCT No.: PCT/KR2016/001682
§ 371 (c)(1),
(2) Date: Jul. 7, 2017

(87) PCT Pub. No.: WO2016/148408
PCT Pub. Date: Sep. 22, 2016

(65) Prior Publication Data
US 2018/0166682 A1    Jun. 14, 2018

(30) Foreign Application Priority Data
Mar. 18, 2015 (KR) .................. 10-2015-0037607

(51) Int. Cl.
*H01M 4/131* (2010.01)
*H01M 2/16* (2006.01)
(Continued)

(52) U.S. Cl.
CPC .......... *H01M 4/131* (2013.01); *H01M 2/145* (2013.01); *H01M 2/168* (2013.01);
(Continued)

(58) Field of Classification Search
None
See application file for complete search history.

(56) References Cited

U.S. PATENT DOCUMENTS

2003/0104273 A1    6/2003    Lee et al.
2011/0281150 A1    11/2011   Yong et al.
(Continued)

FOREIGN PATENT DOCUMENTS

JP    2007280781 A    10/2007
JP    2014130819 A    7/2014
(Continued)

OTHER PUBLICATIONS

Ahn et al. (KR 20020071204) (a raw machine translation) (Abstract) (Sep. 12, 2002) (Year: 2002).*
(Continued)

*Primary Examiner* — Carmen V Lyles-Irving
(74) *Attorney, Agent, or Firm* — Lerner, David, Littenberg, Krumholz & Mentlik, LLP

(57) ABSTRACT

The present disclosure relates to an integrated electrode assembly, wherein a positive electrode, a first binder polymer layer, an inorganic coating layer comprising a plurality of inorganic layers and a second binder polymer, a third binder polymer layer, and a negative electrode are sequentially stacked and combined, each configurative element forming the electrode assembly is stacked and combined with excellent adhesion, and the durability of the inorganic coating layer preventing the internal short circuit of the electrode is excellent, and thus a lithium secondary battery using the integrated electrode assembly according to the present disclosure may have excellent cycle characteristics.

6 Claims, 1 Drawing Sheet

(51) Int. Cl.
*H01M 10/04* (2006.01)
*H01M 10/052* (2010.01)
*H01M 2/14* (2006.01)
*H01M 4/04* (2006.01)
*H01M 4/02* (2006.01)

(52) U.S. Cl.
CPC ....... *H01M 2/1646* (2013.01); *H01M 4/0404* (2013.01); *H01M 10/04* (2013.01); *H01M 10/052* (2013.01); *H01M 2004/021* (2013.01)

(56) References Cited

U.S. PATENT DOCUMENTS

| | | |
|---|---|---|
| 2013/0244082 A1 | 9/2013 | Lee et al. |
| 2014/0004406 A1 | 1/2014 | Chang et al. |
| 2014/0093784 A1 | 4/2014 | Kwon et al. |
| 2014/0212728 A1 | 7/2014 | Kaneda et al. |
| 2014/0248525 A1 | 9/2014 | Iwai et al. |
| 2015/0034249 A1* | 2/2015 | Lee .................. H01M 10/0404 156/379.7 |
| 2015/0311490 A1 | 10/2015 | Murase et al. |

FOREIGN PATENT DOCUMENTS

| | | |
|---|---|---|
| JP | 2014137985 A | 7/2014 |
| JP | 2014517490 A | 7/2014 |
| KR | 100406690 B1 | 11/2003 |
| KR | 100571256 B1 | 4/2006 |
| KR | 20120100783 A | 9/2012 |
| KR | 20130004084 A | 1/2013 |
| KR | 20130011973 A | 1/2013 |
| WO | 2014081035 A1 | 5/2014 |

OTHER PUBLICATIONS

Ahn et al. (KR 20020071204) (a raw machine translation) (Detailed Description) (Sep. 12, 2002) (Year: 2002).*
Chang et al. (KR 20130004084) (a raw machine translation) (Abstract) (Jan. 9, 2013) (Year: 2013).*
Chang et al. (KR 20130004084) (a raw machine translation) (Detailed Description) (Jan. 9, 2013) (Year: 2013).*
Chang et al. (KR 20130004084) (a raw machine translation) (Drawings) (Jan. 9, 2013) (Year: 2013).*
Search Report from International Application No. PCT/KR2016/001682, dated Jun. 2, 2016.
Extended European Search Report for Application No. EP16765164 dated Dec. 18, 2017.

* cited by examiner

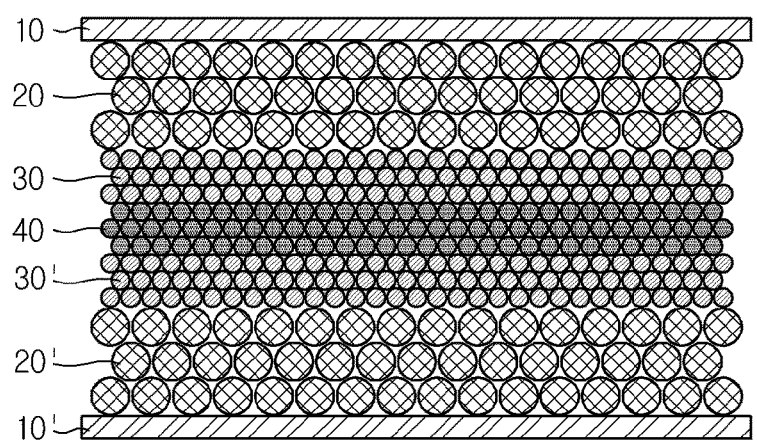

INTEGRATED ELECTRODE ASSEMBLY AND ELECTROCHEMICAL DEVICE COMPRISING SAME

CROSS-REFERENCE TO RELATED APPLICATIONS

The present application is a national phase entry under 35 U.S.C. § 371 of International Application No. PCT/KR2016/001682 filed on Feb. 19, 2016, published in Korean, which claims priority from Korean Application No. 10-2015-0037607 filed Mar. 18, 2015, the disclosures of which are all incorporated herein by reference in their entireties.

TECHNICAL FIELD

The present disclosure relates to an integrated electrode assembly and an electrochemical device comprising the same.

BACKGROUND ART

Recently, interest in energy storing technologies is gradually increasing. As application fields expand to energies for mobile phones, camcorders and notebook PCs, and further, electric vehicles, efforts for research and development on electrochemical devices are gradually materializing. Electrochemical device is a field gathering the most attention in this aspect, and especially, development on chargeable and dischargeable secondary batteries is becoming the focus of interest. Recently, in developing such batteries, research and development are underway to design new electrodes and batteries in order to improve capacity density and specific energy.

Of the secondary batteries that are currently being applied, lithium secondary batteries developed in the early 1990s are coming into the spotlight due to advantages of higher operating voltage and much greater energy density compared to conventional batteries such as N—MH, Ni—Cd, lead-sulfate batteries and the like that use aqueous solution electrolyte. However, these lithium ion batteries have safety problems such as ignition, explosion and the like, caused by using organic electrolyte, and disadvantages of difficulty in manufacturing.

Evaluating safety and securing safety of the aforementioned batteries is very important. The most important consideration is that the batteries should not inflict injury to a user when they malfunction, and for this purpose, ignition, smoke generation and the like inside the batteries are being strictly regulated by battery safety standards. Therefore, in order to resolve the safety problems, numerous resolving methods are being presented.

For example, lithium ion batteries and lithium ion polymer batteries generally use polyolefin series separators to prevent short circuit of a positive electrode and a negative electrode. However, a polyolefin series separator has disadvantages of the characteristic of the material of the separator, for example, the characteristic of the polyolefin series generally melting at 200□ or below, and the processing characteristic, for example, heat-shrinking according to its original size at a high temperature due to the characteristic of going through a stretching process for adjusting the pore size and porosity. Therefore, in the case where the temperature of a battery rises due to an internal/external stimulus, there is high possibility of a positive electrode and a negative electrode being shorted from each other due to the shrinking or melting and the like of the separator, and by emission and the like of electrical energy due to the aforementioned, the battery will show high risk of explosion and the like.

In order to compensate the aforementioned, a composite separator, in which an inorganic particle coating layer is formed on a polyolefin series material, was proposed, but such a composite separator has weak adhesion strength to electrodes, and has a relatively thick thickness that does not live up to the recent tendency of separators becoming thinner, and thus there needs to be improved.

Recently, an electrode-separator integrated electrode assembly is being proposed, where an inorganic coating layer is formed on an electrode active material layer to serve as a conventional separator. However, the inorganic coating layer formed in the electrode active material layer as aforementioned is not coated on a material such as a polyolefin film, and thus has a problem of having low mechanical strength and easily generating cracks, and therefore, there was a problem of difficulty in securing safety in an electrochemical device using such an electrode-separator integrated electrode assembly.

DISCLOSURE

Technical Problem

Thus, a purpose of the present disclosure is to provide an electrode-separator integrated electrode assembly where configurative elements forming the electrode assembly are adhered with excellent adhesion, and where internal short circuit between electrodes can be effectively prevented.

Further, another purpose of the present disclosure is to provide a method for manufacturing the aforementioned integrated electrode assembly.

Further, yet another purpose of the present disclosure is to provide an electrochemical device that includes the integrated electrode assembly to exhibit excellent battery performance.

The other objectives and advantages of the present disclosure can be understood with the following description and more clearly with the embodiments of the present disclosure. Also, it should easily be understood that the other objectives and advantages of the present disclosure can be implemented by the means described in the claims and the combinations thereof.

Technical Solution

In order to resolve the aforementioned technical problems, in one aspect of the present disclosure, an integrated electrode assembly is provided, where a positive electrode, a first binder polymer layer, an inorganic material coating layer comprising a plurality of inorganic particles and a second binder polymer, a third binder polymer layer, and a negative electrode are sequentially stacked and combined.

The internal short circuit of the positive electrode and the negative electrode may be prevented by the inorganic material coating layer.

The inorganic particle forming the inorganic coating layer is an inorganic particle having a dielectric constant of 5 or above, or a mixture thereof.

The inorganic particle having a dielectric constant of 5 or above is a mixture of one or two or more types selected from a group consisting of $BaTiO_3$, $SnO_2$, $CeO_2$, $MgO$, $Mg(OH)_2$, $NiO$, $CaCO_3$, $CaO$, $ZnO$, $ZrO_2$, $Y_2O_3$, $SiO_2$, $Al(OH)_3$, $AlOOH$, $Al_2O_3$ and $TiO_2$.

The first binder polymer layer and the third binder polymer layer may independently have a thickness of a range of 0.2 to 5.0 µm.

The electrode may include a current collector, and an electrode active material layer formed on at least one surface of the current collector, and either or both the first binder polymer layer and the second binder polymer layer may contact the electrode active material layer.

In another aspect of the present disclosure, an electrochemical device including the aforementioned electrode assembly is provided, and the electrochemical device may be a lithium secondary battery.

In yet another aspect of the present disclosure, a method for manufacturing a separator integrated electrode assembly is provided, the method comprising forming a first binder polymer layer by coating and drying a first binder polymer solution on top of a release film (S1); forming an inorganic coating layer by coating and drying, on top of the first binder polymer layer, a slurry including a plurality of inorganic particles and a second binder polymer (S2); forming a third binder polymer layer by coating and drying a third binder solution on top of the inorganic coating layer (S3); stacking and laminating the third binder polymer layer to contact an electrode active material layer (S4); and removing the release film attached to the first binder polymer layer, and stacking and laminating the first binder polymer layer to contact an active material layer of another electrode (S5).

In yet another aspect of the present disclosure, a method for manufacturing a separator integrated electrode assembly is provided, the method comprising forming an inorganic coating layer by coating and drying, on top of a release film, a slurry including a plurality of inorganic particles and a second binder polymer (S1); forming a first binder polymer layer by removing the release film and coating and drying a first binder polymer solution on top of the inorganic coating layer (S2); forming a third binder polymer layer by coating and drying a third binder polymer solution on the inorganic coating layer where the first binder polymer layer is not formed (S3); and stacking and laminating the first binder polymer layer and the third binder polymer layer to each contact an electrode active material layer (S4).

If the first binder polymer solution and the third binder polymer solution are the same solutions, it is possible to perform coating of the step (S2) and step (S3) simultaneously in the dip coating method, so that the first binder polymer coating layer and the third binder polymer layer are formed simultaneously.

Advantageous Effects

An electrode assembly according to one aspect of the present disclosure is manufactured such that an inorganic coating layer for preventing internal short circuit of a positive electrode and a negative electrode is bound to the electrode in an integrated form, and thus excellent adhesion is secured between the electrode and the inorganic coating layer.

Since each configurative element forming the electrode assembly is stacked and combined with excellent adhesion, a lithium secondary battery using the integrated electrode assembly according to the present disclosure may have excellent cycle characteristics.

Further, since the inorganic coating layer is attached to the electrode through a binder polymer layer, the durability of the inorganic coating layer is improved, thereby effectively resolving the longitudinal cracking problem that a conventional inorganic coating layer has.

Further, since the binder polymer layer is not directly formed in the electrode, a problem of the structure of an electrode active material layer being disrupted or the structural solidity being undermined, that is a problem in the case where a binder polymer solution is coated and applied to the electrode active material layer, does not occur.

DESCRIPTION OF DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

FIG. 1 is a view schematically illustrating a cross-section of an integrated electrode assembly according to one embodiment aspect of the present disclosure.

BEST MODE

Hereinafter, preferred embodiments of the present disclosure will be described in detail with reference to the accompanying drawing. Prior to the description, it should be understood that the terms used in the specification and the appended claims should not be construed as being limited to general and dictionary meanings, but interpreted based on the meanings and concepts corresponding to technical aspects of the present disclosure on the basis of the principle that the inventor is allowed to define terms appropriately for the best explanation. Therefore, the embodiments disclosed in the present specification and the configurations illustrated in the drawings are merely the most preferred embodiments of the present disclosure, and not all of them represent the technical ideas of the present disclosure, and thus it should be understood that there may be various equivalents and modified examples that could substitute therefor at the time of filing the present application.

An integrated electrode assembly according to one aspect of the present disclosure is an integrated electrode assembly where an inorganic coating layer that serves as a conventional general separator serving as a spacer for passing ions, while preventing electrical contact between a positive electrode and a negative electrode; and the electrode where reversible occlusion and emission of lithium occurs, are integrated as one, and more specifically, the integrated electrode assembly is provided, where a positive electrode, a first binder polymer layer, an inorganic coating layer comprising a plurality of inorganic particles and a second binder polymer, a third binder polymer layer, and the negative electrode are sequentially stacked and combined.

The integrated electrode assembly according to one embodiment aspect of the present disclosure is schematically illustrated in FIG. 1.

According to FIG. 1, a positive electrode current collector 10, a positive electrode active material layer 20, a first binder polymer layer 30, an inorganic coating layer 40 comprising a plurality of inorganic particles and a second binder polymer, a third binder layer 30', a negative active material layer 20', and a negative electrode current collector 10' are sequentially stacked. Further, the first binder polymer layer, third binder polymer layer and inorganic coating layer are each coated on an entirety of its lower layer (surface subject to coating), respectively.

The inorganic coating layer is formed by being bound to each other by the second binder polymer and the like in a state where a plurality of inorganic particles are charged and contact each other, and thus an 'interstitial volumes' structure may be formed between the inorganic particles, thereby forming a uniform porous structure.

The pore size and porosity of the inorganic coating layer are important influence factors in adjusting ion conductivity. In one embodiment of the present disclosure, it is preferable that the pore size and porosity of the inorganic coating layer have ranges of 0.01 to 10 μm and 20 to 75%, respectively.

There is no particular limitation on the thickness of the inorganic coating layer, but it may be adjusted in consideration of battery performance. In the aspect of reducing internal resistance of the battery, it is preferable that the inorganic coating layer has a thickness range of 1 to 50 μm or 1 to 20 μm.

The main configurative components forming the inorganic coating layer are inorganic particles and the second binder polymer, of which the inorganic particle is not particularly limited as long as it can prevent short circuit of the negative electrode and the positive electrode and is stable electrochemically. That is, there is no particular limitation on the inorganic particle that may be used in the present disclosure as long as it does not cause an oxidation and/or reduction reaction in the operating voltage range of the battery being applied (for example, 0 to 5V based on Li/Li$^+$). Especially, using inorganic particles having ion transfer capability may increase the ion conductivity within the electrochemical device, and thus promote performance enhancement, and thus it is preferable that the ion conductivity is high as possible. Further, in the case where the inorganic particles have high density, there may be not only difficulty in dispersing the inorganic particles during coating, but also a problem of weight increase when manufacturing the battery, and thus it is preferable that the density is small as possible. Further, inorganics with high dielectric constant may contribute to increase of dissociation rate of electrolyte salt within liquid electrolyte, for example, lithium salt, thereby improving the ion conductivity of the electrolyte.

For the aforementioned reasons, it is preferable that the inorganic particles are inorganic particles with a dielectric constant of 5 or above, inorganic particles having lithium ion transfer capability, or a mixture thereof.

Non-limiting examples of the inorganic particles with a dielectric constant of 5 or above include $BaTiO_3$, $SnO_2$, $CeO_2$, $MgO$, $Mg(OH)_2$, $NiO$, $CaCO_3$, $CaO$, $ZnO$, $ZrO_2$, $Y_2O_3$, $SiO_2$, $Al(OH)_3$, $AlOOH$, $Al_2O_3$, $TiO_2$, or a mixture thereof and the like.

There is no limitation on the size of the inorganic particle, but it is preferable that the size of the inorganic particle has a range of 0.01 to 10 μm, if possible, for formation of a coating layer with uniform thickness and a suitable porosity. If the size of the inorganic particle is less than 0.01 μm, the specific surface area will increase, making it difficult to adjust the property of the inorganic coating layer, and if the size of the inorganic particle exceeds 10 μm, the thickness of the inorganic coating layer manufactured with the same solid content will increase, deteriorating the mechanical property, and due to the excessively large pore size, the possibility of causing internal short circuit during battery charging and discharging will increase.

The inorganic coating layer may be applied in an amount of 1 to 30 g/m$^2$, and when used between the electrodes in the amount of the aforementioned numerical range, high-temperature stability of the battery may be secured without significantly deteriorating the battery performance.

Another main configurative component forming the inorganic coating layer is the binder polymer (second binder polymer). Especially, a binder polymer with a glass transition temperature $T_g$ that is as low as possible, may be used, preferably, a binder polymer having a glass transition temperature of a range of −200 to 200□. This is because such a binder polymer could improve the mechanical property such as flexibility, elasticity and the like of the inorganic coating layer. The second binder polymer serves to improve the adhesiveness between the inorganic particles and the adhesiveness between the inorganic coating layer and an electrode adhesion layer (that is, the first and/or third binder polymer layer).

The second binder polymer may not necessarily have the ion transfer capability, but when using the binder polymer having ion transfer capability, performance of the electrochemical device may be further improved. Therefore, it is preferable that the second binder polymer has a dielectric constant that is as high as possible.

In fact, the dissociation rate of salt in the electrolyte depends on the dielectric constant of the electrolyte solvent, and thus the higher the dielectric constant of the second binder polymer, the more improved the dissociation rate of salt in the electrolyte may become. The dielectric constant of the second binder polymer may have a range of 1.0 to 100 (measurement frequency=1kHz), and especially, 10 or above is preferable.

Further, the second binder polymer may have a characteristic of gelating when being swollen in liquid electrolyte, thereby exhibiting a high degree of swelling in the electrolyte.

Non-limiting examples of the second binder polymer that may be used in the present disclosure include polyethylene oxide, polyvinylidene fluoride, polyvinylidene fluoride-hexafluoropropylene, polyvinylidene fluoride-trichloroethylene, polymethyl methacrylate, polyacrylonitrile, polyacrylonitrile-styrene copolymer, polyvinyl chloride (PVC), polyvinylpyrrolidone, polyvinyl acetate, polyethylene vinyl acetate copolymer, gelatine, cyanoethylpullulan, cyanoethyl polyvinyl alcohol, cyanoethyl cellulose, cyanoethyl sucrose, pullulan, cellulose acetate, cellulose acetate butyrate, cellulose acetate propionate, polyethylene glycol, glyme, polyethylene glycol dimethyl ether, carboxymethyl cellulose or mixtures thereof.

There is no particular limitation on the composition of the inorganic particles and the second binder polymer in the inorganic coating layer, and the composition may be adjusted according to the necessary thickness and structure of the coating layer. More specifically, it is advised to adjust the composition ratio of the inorganic particles and the second binder polymer to be within a weight ratio range of 10:90 to 99:1, and a weight ratio range of 50:50 to 98:2 is preferable. In the case where the composition ratio of the inorganic particles and the second binder polymer is less than 10:90, the content of the second binder polymer will be too much, leading to reduction of pore size and porosity caused by reduction of interstitial volume formed between the inorganic particles, causing the final battery performance to deteriorate.

The first binder polymer layer and the third binder polymer layer are layers formed between the electrode active material layer and the inorganic coating layer in order to adhere the electrode active material layer and the inorganic coating layer more effectively, and regarding the binder polymer that may be used on the first binder polymer layer and the third binder polymer layer, the aforementioned description with respect to the second binder polymer will be referenced.

The first binder polymer layer and the third binder polymer layer may independently have a thickness of 0.2 to 10 μm or 0.5 to 5 μm, respectively. The first binder polymer layer and the third binder polymer layer must have thicknesses of 0.2 μm or more so as to effectively adhere the inorganic coating layer, and thicknesses of less than 5 μm so as to secure a suitable permeability within the electrode assembly and allow the battery to have a compact volume.

There is no particular limitation on the electrode that can be used in the present disclosure, and may be manufactured in a form where the electrode active material is bound to an entirety of the current collector according to a general method known in the related art.

Non-limiting examples of the positive electrode active material, of the electrode active material, that can be used include general positive electrode active material that can be used in positive electrodes of a conventional electrochemical device, especially, it is preferable to use lithium manganese oxide, lithium cobalt oxide, lithium nickel oxide, lithium iron oxide, or a lithium composite oxide that is a mixture thereof.

Non-limiting examples of the negative active material include general negative active material that can be used in negative electrodes of a conventional electrochemical device, especially, lithium metal or lithium alloy, carbon, petroleum coke, activated carbon, graphite, or lithium absorbant material such as other carbonaceous material and the like.

Non-limiting examples of the positive electrode current collector include foil and the like manufactured by aluminum, nickel, or a combination thereof, and non-limiting examples of the negative electrode current collector include foil manufactured by copper, gold, nickel or copper alloy, or a combination thereof.

Hereinafter, a preparation method for manufacturing an electrode assembly according to one aspect of the present disclosure will be exemplified below, but there is no limitation thereon.

First, a first binder polymer layer is formed by coating and drying a first binder polymer solution on top of a release film (step (S1)).

The first binder polymer solution is manufactured by dissolving a first binder polymer in a solvent. For compounds that can be used as the first binder polymer, the aforementioned description will be referenced.

Non-limiting examples of the useable solvent include acetone, tetrahydrofuran, methylene chloride, chloroform, dimethylformamide, N-methyl-2-pyrrolidone (NMP), cyclohexane, water, or a mixture thereof and the like.

The content of the first binder polymer, of the first binder polymer solution, may be a content that can exhibit excellent adhesiveness with the inorganic coating layer and the electrode active material layer while not blocking pores of these layers, for example, a content of about 0.1 to about 10 parts by weight, preferably about 1 to about 6 parts by weight, based on 100 parts by weight of the inorganic coating layer.

The release film is a material that enables the binder polymer layer formed on one surface of the release film to be easily released thereafter, and may include any material. Non-limiting examples that may be used include a polyester film such as polyethylene terephthalate, a polypropylene film and the like, and to further improve the releaseness, a compound containing silicone may be applied and used. The compound containing silicone may be indicated by chemical formula 1 below.

[Chemical formula 1]

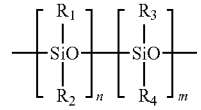

(In the chemical formula 1, $R_1$, $R_2$, $R_3$ and $R_4$ may each be straight chain or branched chain alkyl, cycloalkyl, alkenyl, aryl, aralkyl, halogenated aryl, halogenated aralkyl, phenyl, mercaptane, methacrylate, acrylate, epoxy or vinyl ether, the alkyl having a carbon number of $C_1$ to $C_{18}$, the cycloalkyl having a carbon number of $C_3$ to $C_{18}$, the alkenyl having a carbon number of $C_2$ to $C_{18}$, the aryl and the aralkyl having a carbon number of $C_6$ to $C_{18}$, and n and m may be different from or identical to each other, and may be whole numbers of 1 to 100,000.)

There is no particular limitation to the thickness of the release film, but it may be 0.5 to 30 μm or 1 to 15 μm, for example.

As the method for coating the first binder polymer solution on the release film, a general coating method known in the related art may be used, for example, various methods such as dip coating, die coating, roll coating, comma coating, or a method of a mixture thereof and the like.

Here, an inorganic coating layer is formed by coating and drying, on top of the first binder polymer layer, a slurry including a plurality of inorganic particles and a second binder polymer (step (S2)).

For this purpose, the second binder polymer is dissolved in a solvent to prepare a binder polymer solution or emulsion, and then inorganic particles are added to the resulting second binder polymer solution or emulsion and dispersed.

For the solvent that can be used, the types of compounds aforementioned with respect to the first binder polymer solution at the step (S1) will be referenced.

After adding the inorganic particles to the second binder polymer solution, it is preferable to perform dispersion of the inorganic particles. Here, the suitable dispersion time is 1 to 20 hours, and it is preferable that the particle size of the inorganic particle is 0.01 to 10 μm as mentioned above. For the dispersion method, a general method may be used, especially, ball mill method is preferable. Then, the second binder polymer solution where the inorganic particles are dispersed, is coated and dried on top of the first binder polymer layer. Here, for the coating method that can be used, the coating method aforementioned with respect to the first binder polymer solution at the step (S1) will be referenced.

Then, a third binder polymer layer is formed by coating and drying a third binder polymer solution on top of the inorganic coating layer (step (S3)).

For the type and content of the binder polymer compound and solvent, or the coating method to be used in forming the third binder polymer layer, the description at step (S1) will be referenced, except that the binder polymer solution is coated and dried on top of the inorganic coating layer instead of the release film.

Then, the third binder polymer layer is stacked to contact an active material layer of a positive electrode or a negative electrode, and then laminated (step (S4)).

This process may be performed by, for example, stacking the third binder polymer layer to contact the negative electrode, and then laminating the same at a temperature of, for example, 80 to 105□.

Lastly, the release film attached to the first binder polymer layer is removed, and the first binder polymer layer is stacked to contact an active material layer of another electrode, and then laminated (step (S5)).

This process may be performed by, for example, removing the release film attached to the first binder polymer layer, stacking such that the surface from which the release film has been removed contacts the positive electrode, and then laminating the same at a certain temperature of, for example, 80 to 105□.

A method for manufacturing a separator integrated electrode assembly according to another aspect of the present disclosure includes a step of forming an inorganic coating layer by coating and drying, on top of a release film, a slurry including a plurality of inorganic particles and a second binder polymer (S1); a step of forming a first binder polymer layer by removing the release film and coating and drying a first binder polymer solution on top of the inorganic coating layer (S2); a step of forming a third binder polymer layer by coating and drying a third binder polymer solution on the inorganic coating layer where the first binder polymer layer is not formed (S3); and a step of stacking and laminating the first binder polymer layer and the third binder polymer layer to each contact an electrode active material layer (S4). In this case, if the first binder polymer solution and the third binder polymer solution are the same solutions, it is possible to perform coating of the step (S2) and step (S3) simultaneously in the dip coating method, so that the first binder polymer coating layer and the third binder polymer layer are formed simultaneously. For the material and process method to be used in this manufacturing method, the description of the manufacturing method mentioned above will be referenced.

As confirmed from the aforementioned manufacturing method, since the entirety of the binder polymer layer of the present disclosure, that is, the first binder polymer layer and the third binder polymer layer are stacked on the electrode and laminated in a dried state, the binder polymer solution does not contact the electrode. Therefore, a problem where the binder polymer solution is directly coated and applied to the electrode, and introduced into the electrode active material layer, to disrupt an entirety or portion of the structure of the electrode active material layer and the like does not occur.

In one aspect of the present disclosure, an electrochemical device including the electrode assembly is provided.

As the electrochemical device, a lithium secondary battery is preferable, and examples of the lithium secondary battery include lithium metal secondary battery, lithium ion secondary battery, lithium polymer secondary battery or lithium ion polymer secondary battery and the like.

Best Mode

Hereinafter, preferable embodiments will be presented to help understand the present disclosure, but the embodiments below merely exemplify the present disclosure, and the scope of the present disclosure is not limited by the embodiments below.

EXAMPLE 1

As the first and third binder polymer solutions for forming an electrode adhesion layer, polyvinylidene fluoride (PVDF) copolymer emulsion (RC, 10-280 of Arkema) and a fluorinated acryl-based binder (TRD202A of JSR) were dispersed in water by 5:5, to prepare a binder polymer solution.

Meanwhile, to form an inorganic coating layer, boehmite (Actilox 200 SM of Nabaltec AG) with an average diameter of 0.2 μm, and carboxymethyl cellulose (SG-L02 of GL Chem) and acryl-based particles (CSB130 of Toyo Ink) were dispersed in water by a composition ratio of 90:5:5, to prepare a slurry for forming an inorganic coating layer.

On top of a release-treated polyethylene terephthalate (PET) film, the first binder polymer solution was coated and dried to form a first binder polymer layer, and then the slurry for forming the inorganic coating layer was coated and dried to form the inorganic coating layer, and then a third binder polymer solution was coated and dried to form a third binder polymer layer.

Then, the third binder polymer layer was stacked to contact a negative active material layer, and then lamination was performed at about 80□ using a laminator. Then, the polyethylene terephthalate film, that is a release film attached to the first binder polymer layer, was removed, and the first binder polymer layer was stacked to contact a positive electrode material layer, and then lamination was performed at about 80□.

COMPARATIVE EXAMPLE 1

A slurry for forming an inorganic coating layer was prepared with the same manner as in Example 1.

The slurry was coated and dried on a negative electrode active material layer to coat and dry an inorganic coating layer on top of the negative electrode active material layer. Then, the inorganic coating layer and a positive electrode active material layer were stacked such that they contact each other, and then lamination was performed at 80□ using a laminator.

EXPERIMENT EXAMPLES

The electrode assemblies manufactured in Example 1 and Comparative Example 1 were pressed by a ball crush equipment to check the time point when an internal short circuit occurs.

In the electrode assembly of Example 1, an internal short circuit occurred at 519 kgf, whereas in that of Comparative Example 1, an internal short circuit occurred at 82 kgf, which represents that greater safety was secured in Example 1 over Comparative Example 1.

What is claimed is:

1. A method for manufacturing an integrated electrode assembly, the method comprising:
    coating an a first binder polymer solution on a release film, wherein the first binder polymer solution consists of a first binder polymer and a solvent;
    drying the first binder polymer solution to form a first binder polymer layer on the release film;
    coating a slurry on the first binder polymer layer, wherein the slurry including a plurality of inorganic particles and a second binder polymer;
    drying the slurry to form an inorganic coating layer on the first binder polymer layer, wherein the inorganic coating layer includes interstitial volumes formed between the inorganic particles, and wherein the plurality of inorganic particles are bound to each other by the second binder polymer in the inorganic coating layer;
    coating a third binder solution on the inorganic coating layer, wherein the third binder polymer solution includes a third binder polymer and a solvent;
    drying the third binder solution to form a third binder polymer layer on the inorganic coating layer;
    laminating the third binder polymer layer to a first electrode active material layer of a first electrode, the first electrode including the first electrode active material layer disposed on a first current collector; and removing the release film attached to the first binder polymer layer; and laminating the first binder polymer layer to a second active material layer of a second electrode, the second electrode including the second electrode active material layer disposed on a second current collector, where the solvent of the first and third binder solution is selected from the group consisting of acetone, tetrahydrofuran, methylene chloride, chloroform, dimethylformamide, N-methyl-2-pyrrolidone (NMP), cyclohexane, water, or a mixture thereof.

2. A method for manufacturing a separator integrated electrode assembly, the method comprising:

coating a slurry on a release film, wherein the slurry consists of a plurality of inorganic particles, a second binder polymer, and a solvent;

drying the slurry to form an inorganic coating layer on the release film, wherein the inorganic coating layer includes interstitial volumes formed between the inorganic particles, and wherein the plurality of inorganic particles are bound to each other by the second binder polymer in the inorganic coating layer;

removing the release film from the inorganic coating layer;

coating a first binder polymer solution on a first surface of the inorganic coating layer, wherein the first binder polymer solution includes a first binder polymer and a solvent;

drying the first binder polymer solution to form a first binder polymer layer on the first surface of the inorganic coating layer;

coating a third binder polymer solution on a second surface of the inorganic coating layer, wherein the second surface is opposite of the first surface, and wherein the third binder polymer solution includes a third binder polymer and a solvent;

drying the third binder polymer solution to form a third binder polymer layer on the second surface of the inorganic coating layer;

laminating the first binder polymer layer to a first active material layer of a first electrode, the first electrode including the first electrode active material layer disposed on a first current collector; and laminating the third binder polymer layer to a second electrode active material layer of a second electrode, the second electrode including the second electrode active material layer disposed on a second current collector, where the solvent of the first and third binder solution is selected from the group consisting of acetone, tetrahydrofuran, methylene chloride, chloroform, dimethylformamide, N-methyl-2-pyrrolidone (NMP), cyclohexane, water, or a mixture thereof.

3. The method for manufacturing a separator integrated electrode assembly of claim 2, wherein the first binder polymer solution and the third binder polymer solution are the same solution, and wherein the coating of the first and second surfaces of the inorganic coating layer is performed simultaneously by dip coating.

4. The method of claim 2, where the solvent of the slurry is water.

5. The method of claim 2, wherein the first binder polymer solution consists of the first binder polymer and the solvent, and wherein the third binder polymer solution consists of the third binder polymer and the solvent.

6. The method of claim 1, wherein the third binder polymer solution consists of third binder polymer solution and the solvent.

* * * * *